(12) United States Patent
Tanabe (10) Patent No.: US 10,358,098 B2
(45) Date of Patent: Jul. 23, 2019

(54) VEHICLE SPEAKER SYSTEM

(71) Applicant: ALPINE ELECTRONICS, INC., Shinagawa-ku, Tokyo (JP)

(72) Inventor: Kei Tanabe, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/819,095

(22) Filed: Nov. 21, 2017

(65) Prior Publication Data

US 2018/0194298 A1    Jul. 12, 2018

(30) Foreign Application Priority Data

Jan. 6, 2017    (JP) .................... 2017-001112

(51) Int. Cl.
*B60R 11/02* (2006.01)
*H04R 1/02* (2006.01)

(52) U.S. Cl.
CPC .......... *B60R 11/0217* (2013.01); *H04R 1/023* (2013.01); *H04R 1/025* (2013.01); *H04R 1/028* (2013.01); *H04R 1/021* (2013.01); *H04R 2499/13* (2013.01)

(58) Field of Classification Search
CPC ..... B60R 11/0217; H04R 1/028; H04R 1/023; H04R 1/025; H04R 1/021; H04R 2499/13
See application file for complete search history.

(56) References Cited

U.S. PATENT DOCUMENTS 2,233,459 A * 3/1941 Caulton ............ B60R 11/0217
181/150
3,045,776 A * 7/1962 Igarashi ............... H04R 1/025
181/171
4,179,009 A * 12/1979 Birkner ................. H04R 1/025
181/141
4,572,326 A * 2/1986 Hutchins ............ B60R 11/0217
181/150
4,597,470 A * 7/1986 Takagi ................ B60R 11/0217
181/141

(Continued)

FOREIGN PATENT DOCUMENTS

JP    1-126679    8/1989

OTHER PUBLICATIONS

Extended European Search Report for 17209729.7 dated Mar. 9, 2018, 6 pgs.

*Primary Examiner* — Oyesola C Ojo
(74) *Attorney, Agent, or Firm* — Brinks Gilson & Lione (57) ABSTRACT

A vehicle speaker system includes a speaker having a diaphragm that generates a sound pressure, a frame that supports the diaphragm vibratably, and a driving unit attached to the frame to drive the diaphragm. A position of the speaker relative to a partition separating a vehicle-cabin inner space and an engine compartment inner space is determined so that the sound pressure generated by an action of the diaphragm passes through an opening in the partition. A shield member is provided with at least a part thereof being located between the speaker and an obstacle generation source located in the engine compartment inner space to obstruct an operation of the speaker. An open part allowing a first space provided between the speaker and the shield member to communicate with the engine compartment inner space is provided in such a direction as not to be directed toward the obstacle generation source.

22 Claims, 8 Drawing Sheets

(56) References Cited

U.S. PATENT DOCUMENTS

| | | | | |
|---|---|---|---|---|
| 5,416,283 | A * | 5/1995 | Dault | B60R 11/0217 |
| | | | | 181/141 |
| 6,601,645 | B1 * | 8/2003 | Abdo | H04R 9/022 |
| | | | | 165/185 |
| 9,253,562 | B2 * | 2/2016 | Ludwig | H04R 1/2819 |
| 9,386,376 | B2 * | 7/2016 | Tada | H04R 9/022 |
| 2005/0259841 | A1 * | 11/2005 | Caron | H04R 1/345 |
| | | | | 381/345 |
| 2010/0148550 | A1 * | 6/2010 | Kidd | B60N 2/879 |
| | | | | 297/217.4 |
| 2013/0272537 | A1 | 10/2013 | Tada et al. | |
| 2014/0105439 | A1 * | 4/2014 | Wirth | H04R 1/00 |
| | | | | 381/338 |
| 2015/0030178 | A1 * | 1/2015 | Sulowski | B60R 11/0217 |
| | | | | 381/86 |
| 2016/0212543 | A1 * | 7/2016 | Kochendoerfer | H04R 9/022 |

\* cited by examiner

VEHICLE SPEAKER SYSTEM

RELATED APPLICATION

The present application claims priority to Japanese Patent Application Number 2017-001112, filed Jan. 6, 2017, the entirety of which is hereby incorporated by reference.

BACKGROUND

1. Field of the Invention

The present invention relates to a vehicle speaker system that allows stable operation of a speaker mounted in a partition between an engine compartment and a vehicle cabin.

2. Description of the Related Art

In speaker systems installed in vehicles (vehicle speaker systems), various methods for improving the quality of sound emitted in a vehicle cabin have been proposed. For example, in an on-vehicle composite speaker apparatus proposed in PTL 1 (Japanese Unexamined Utility Model Registration Application Publication No. 1-126679), a main speaker is mounted at a front opening of a cabinet, a rear opening of the cabinet is covered with a bass-sound auxiliary speaker to form a closed acoustic space therebetween, and a back surface of the auxiliary speaker opens in the interior of an engine compartment. In the speaker apparatus having such a structure, the bass-sound speaker opens in the engine compartment. Hence, it is expected that a thick diaphragm having high sound insulating performance can prevent leakage of noise into the vehicle cabin and that a rich heavy bass sound can be obtained even when the size and diameter of the speaker are small.

In the speaker apparatus disclosed in PTL 1, the bass-sound auxiliary speaker is mounted with its back surface exposed in the engine compartment (FIG. 1 of PTL 1). However, multiple heat generation sources, such as an engine, are provided inside the engine compartment, and wind, rain, and dust may directly contact the portion of the speaker exposed in the engine compartment (exposed portion) from the front side of the vehicle in a running state. In such a condition, reliability of the speaker is reduced and the speaker cannot exhibit its original performance (acoustic characteristics). Although it is conceivable to dispose, for example, a small enclosure behind the speaker for protection, a back pressure is insufficiently removed and this may adversely affect the acoustic characteristics.

SUMMARY

The present disclosure has been made in view of these circumstances of the related art, and an object of the disclosure is to provide a vehicle speaker system including a speaker mounted on a vehicle partition, which separates an engine compartment and a vehicle cabin, and configured to emit a positive-phase sound pressure into the vehicle cabin and to exhaust a reverse-phase sound pressure to the engine compartment. In this vehicle speaker system, the speaker can be prevented from being influenced by heat from the engine compartment and wind pressure associated with vehicle running, and a back pressure is sufficiently removed to reduce the influence on the acoustic characteristics.

To solve the above problems, according to an aspect of the present disclosure, there is provided a vehicle speaker system including a speaker having a diaphragm that generates a sound pressure, a frame that supports the diaphragm vibratably, and a driving unit attached to the frame to drive the diaphragm. A position of the speaker relative to a partition separating a vehicle-cabin inner space and an engine compartment inner space is determined so that the sound pressure generated by an action of the diaphragm passes through an opening provided in the partition. A shield member is provided with at least a part thereof being located between the speaker and an obstacle generation source located in the engine compartment inner space to obstruct an operation of the speaker. An open part allowing a first space provided between the speaker and the shield member to communicate with the engine compartment inner space is provided in such a direction as not to be directed toward the obstacle generation source.

Specific examples of the obstacle generation source include an engine and a communication part in the engine compartment inner space with a space outside the vehicle. Heat generated from the engine, especially an engine block, may reach the speaker and deteriorate the members that constitute the speaker. Foreign matter, such as a pebble, may enter the engine compartment inner space through the communication part and collide with the speaker. Such an obstacle (for example, heat and foreign matter) from the obstacle generation source obstructs a normal operation of the speaker. Accordingly, the adverse influence of the obstacle generation source on the speaker can be avoided by disposing the shield member between the speaker and the obstacle generation source. If the shield member forms a closed space between the shield member and the speaker, the acoustic characteristics of the speaker may be adversely affected. Accordingly, when the first space defined between the shield member and the speaker has the open part communicating with the engine compartment inner space, the back pressure is smoothly removed, and this can reduce the influence on the acoustic characteristics of the speaker.

In the above vehicle speaker system, preferably, the shield member is located to cover at least a center portion of the diaphragm. A section of the diaphragm near the center portion is most susceptible to the influence of wind pressure and heat. Hence, the speaker can be efficiently protected by covering the section.

In the above vehicle speaker system, the shield member may be located inside the engine compartment inner space and at least a part of the speaker may be located inside the vehicle-cabin inner space. When the shield member is located inside the engine compartment inner space, an obstacle shielded by the shield member can be returned into the engine compartment inner space. Moreover, gas inside the first space sometimes more easily moves than when the shield member is located in the vehicle-cabin inner space.

In the above vehicle speaker system, the shield member may be shaped like a plate and may be located to cover the entire opening. In such a structure, an obstacle does not easily enter the vehicle-cabin inner space from the engine compartment inner space. Therefore, the possibility that the obstacle from the obstacle generation source will reach the speaker is reduced more reliably.

In the above vehicle speaker system, preferably, the shield member is located at such a position that the obstacle generation source does not face the opening. When the shield member is disposed in this way, the obstacle emitted straight from the obstacle generation source can be reliably prevented from reaching the speaker. Therefore, the possibility that the obstacle from the obstacle generation source will reach the speaker can be more reliably reduced.

In the above vehicle speaker system, preferably, the open part includes a lower open portion into which a gas in the engine compartment inner space flows and an upper open portion that allows a gas inside the first space to move upward and to be exhausted from the first space. When the obstacle is heat, the shield member is heated. Hence, the gas inside the first space is also heated. For this reason, an ascending air current is easily generated inside the first space. When the open part has the upper open portion, the heated gas in the first space is efficiently exhausted by the ascending air current, and this can suppress an excessive temperature rise in the first space. For this reason, the possibility that the speaker will be adversely affected by the heat is reduced more reliably.

In the above vehicle speaker system, a position of the speaker relative to the partition may be fixed by attaching the frame to the partition. While the method for fixing the position of the speaker relative to the partition is arbitrarily determined, when the frame of the speaker is attached to the partition, the structure as the vehicle speaker system is simple, and this sometimes makes fixing (attachment) easy. The frame of the speaker may be attached to the partition by a separate member (attachment member).

In the above vehicle speaker system, the shield member may be attached to the partition by a support member connected to the shield member. While the method for fixing the position of the shield member relative to the speaker is arbitrarily determined, when the shield member is attached to the partition by the support member connected thereto, the structure as the speaker system is simple, and this sometimes makes attachment easy.

In the above vehicle speaker system, a position of a speaker unit including the shield member and the speaker relative to the partition may be fixed. By preparing a unit (speaker unit) including the shield member and the speaker, the speaker is easily installed in the vehicle while the influence of the obstacle is properly reduced. When the speaker unit can be installed in the vehicle from the inside of the vehicle cabin, installation operability is further enhanced. In this case, when the shield member is smaller than the opening provided in the partition, it can be located inside the engine compartment inner space by installing the speaker unit from the inside of the vehicle cabin.

In the above vehicle speaker system, a low heat-transfer member may be interposed between the shield member and the speaker. When the low heat-transfer member is interposed between the shield member and the speaker, even if the temperature of the shield member is increased by heat received from, for example, the engine block, the possibility that the temperature of the speaker will be increased by heat transfer from the shield member can be reduced.

The above vehicle speaker system may have a structure in which the shield member and the speaker are not in direct contact with each other. When the shield member and the speaker are not in direct contact with each other, even if the temperature of the shield member is increased by heat received from, for example, the engine block, the possibility that the temperature of the speaker will be increased by heat transfer from the shield member can be more reliably reduced.

In the above vehicle speaker system, preferably, the shield member is made of a conductive material and is grounded at least during use. Specific examples of obstacles include not only heat and foreign matter, but also an electromagnetic wave (electromagnetic noise) having a wavelength less than the wavelength of infrared light. When the driving unit for the speaker is a voice coil, driving stability is sometimes impaired by the influence of electromagnetic noise. When the shield member is made of a conductive material and is grounded during use, it also functions as an electromagnetic shield. Therefore, the operation stability of the speaker can be ensured even when the obstacle is the above-described electromagnetic noise.

According to the vehicle speaker system of the present disclosure, the speaker can be prevented from being affected by heat from the engine compartment and wind pressure associated with vehicle running. Moreover, the back pressure is smoothly removed, and this can reduce the influence on the acoustic characteristics.

DESCRIPTION OF THE PREFERRED EMBODIMENTS

Figure 1A:
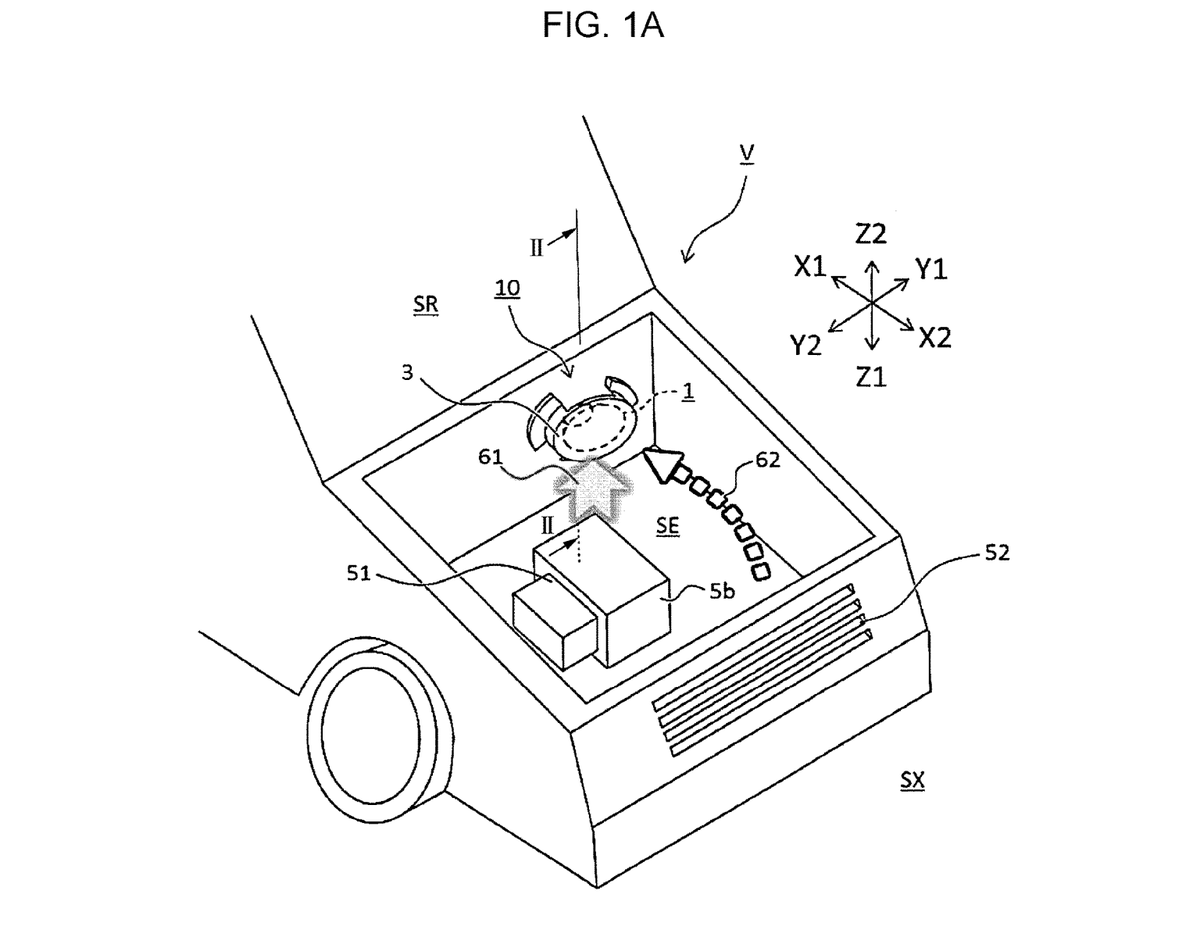
FIGS. 1A and 1B are a perspective view and a top view, respectively, conceptually illustrating a structure of a vehicle equipped with a vehicle speaker system according to an embodiment of the present invention.
Figure 1B:
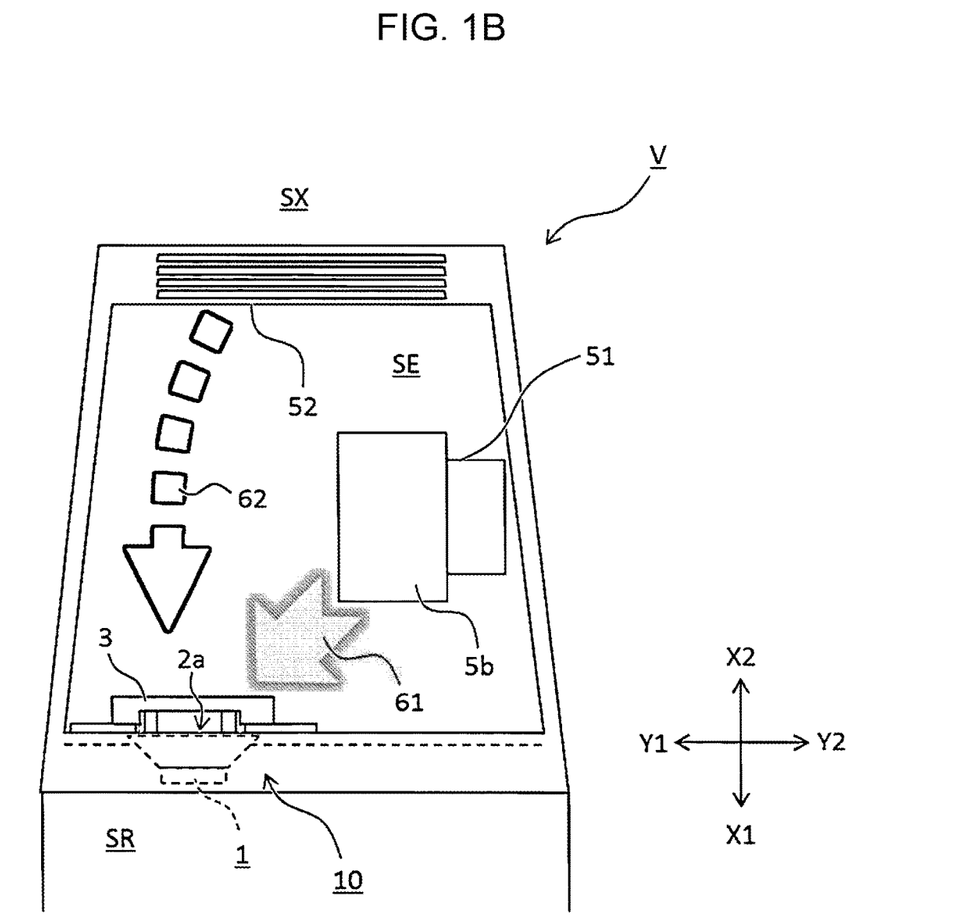
Figure 2:
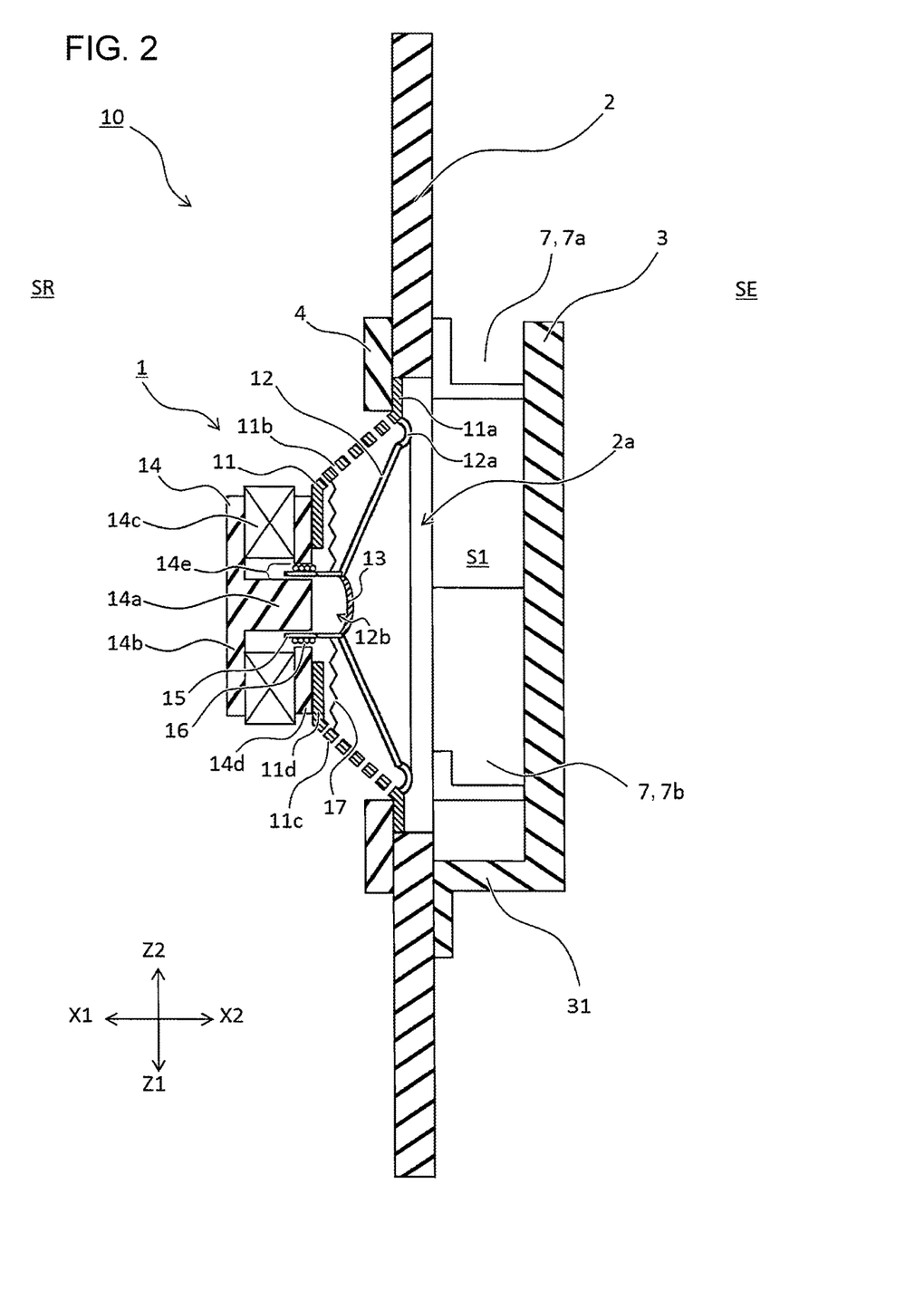
FIG. 2 is a cross-sectional view taken along line II-II in FIG. 1A.

Embodiments of the present invention will be described below with reference to the drawings. FIGS. 1A and 1B are a perspective view and a top view, respectively, conceptually illustrating a structure of a vehicle quipped with a vehicle speaker system according to an embodiment of the present invention. FIG. 2 is a cross-sectional view taken along line II-II in FIG. 1A.

As illustrated in FIG. 2, a vehicle speaker system 10 according to an embodiment of the present invention includes a speaker 1. In the speaker 1, various members are attached to a frame 11 generally shaped like a truncated cone. The frame 11 includes an annular portion 11a on an outer peripheral side and a spoke-shaped support portion 11c extending from the annular portion 11a. For convenience, the support portion 11c is shown by dotted lines to have cut holes 11b in the drawings.

In the speaker 1, a diaphragm 12 for generating sound pressure is generally shaped like a truncated cone, and has an edge 12a on an outer peripheral side. This edge 12a is attached to the annular portion 11a of the frame 11. Specifically, in the speaker 1 illustrated in FIG. 2, the edge 12a is bonded to the annular portion 11a of the frame 11 with adhesive. By thus being supported by the frame 11, the diaphragm 12 can vibrate in the front-rear direction of the frame 11 (X1-X2 direction in FIG. 2).

The diaphragm 12 has an opening (diaphragm opening) 12b in a center portion thereof. A bowl-shaped cap 13 is attached to the diaphragm 12 to close an inner peripheral portion of the diaphragm 12 including the diaphragm opening 12b.

A magnetic circuit part 14 is attached to a top portion (magnetic-circuit attachment portion 11d) of the truncated conical support portion 11c of the frame 11. The magnetic circuit part 14 includes a columnar center pole portion 14a, and the center axis of the center pole portion 14a points in a vibrating direction of the diaphragm 12 (front-rear direction (X1-X2 direction)). A bottom plate portion 14b is provided integrally with a rear surrounding portion (X1-side in the X1-X2 direction) of the center pole portion 14a. An annular magnet 14c is attached to a front side (X2-side in the X1-X2 direction) of the bottom plate portion 14b. An annular top plate portion 14d is attached to a front side (X2-side in the X1-X2 direction) of the magnet 14c. Since the magnet 14c is provided, an annular magnetic gap 14e is formed between the center pole portion 14a and the top plate portion 14d. The bottom plate portion 14b and the top plate portion 14d constitute a yoke part.

A cylindrical bobbin 15 is fixed to a rear side (X1-side in the X1-X2 direction) of the diaphragm 12. As illustrated in FIG. 2, the bobbin 15 is inserted in the magnetic gap 14e of the magnetic circuit part 14 located on the rear side of the diaphragm 12. A voice coil 16 is wound around a side surface of a portion of the bobbin 15 inserted in the magnetic gap 14e. The bobbin 15 reciprocates in the front-rear direction (X1-X2 direction) according to the current flowing through the voice coil 16 located inside the magnetic gap 14e, so that the diaphragm 12 vibrates and generates sound pressure.

A damper 17 is located between the diaphragm 12 and the magnetic circuit part 14 in the front-rear direction (X1-X2 direction). The damper 17 is supported on an outer peripheral side by the support portion 11c of the frame 11, and supports the bobbin 15 on an inner peripheral side. Along with the above-described reciprocating motion of the bobbin 15, not only the diaphragm 12 but also the damper 17 reciprocates in the front-rear direction (X1-X2 direction). The damper 17 is constituted by an elastic member, and has a function of returning the bobbin 15 to a neutral position by an elastic restoring force in a state in which a current does not flow through the voice coil 16.

In the speaker 1 having the above-described structure, a positive-phase sound pressure can be emitted toward a vehicle-cabin inner space SR and a reverse-phase sound pressure can be ejected toward an engine compartment inner space SE by passing a current through the voice coil 16 to vibrate the diaphragm 12.

The speaker 1 is mounted on a partition 2, which separates the vehicle-cabin inner space SR and the engine compartment inner space SE, with a mounting member 4. The partition 2 has an opening 2a. The position of the speaker 1 relative to the partition 2 is determined so that the sound pressure generated by the motion of the diaphragm 12 in the speaker 1 passes through the opening 2a.

As illustrated in FIGS. 1A and 1B, in the engine compartment inner space SE of the vehicle V, an obstacle generation source that obstructs the operation of the speaker 1 is located. In this specification, "obstacle generation source" refers to something that causes an obstacle for impairing stability of the operation of the speaker 1 to exist in the engine compartment inner space SE. In FIGS. 1A and 1B, an engine 51 and a communication part 52 of the engine compartment inner space SE with a vehicle external space SX are illustrated as specific examples of the obstacle generation source. Heat 61 is generated as an obstacle from the engine 51, especially an engine block 5b. From the communication part 52, foreign matter 62, such as pebbles, rain, dust, and leaves, may enter the engine compartment inner space SE as an obstacle and contact the speaker 1. Such an obstacle (for example, heat 61 and foreign matter 62) from the obstacle generation source (engine 51 and communication part 52) obstructs a normal operation of the speaker 1.

Accordingly, in the vehicle speaker system 10 according to the embodiment of the present invention, a shield member 3 is provided in such a manner that at least a part thereof is located between the obstacle generation source (engine 51 and communication part 52) in the engine compartment inner space SE and the speaker 1. By disposing the shield member 3 between the speaker 1 and the obstacle generation source (engine 51 and communication part 52), an obstacle (for example, heat 61 and foreign matter 62) from the obstacle generation source (engine 51 and communication part 52) can be prevented from adversely affecting the speaker 1.

The material of the shield member 3 is arbitrarily determined as long as the shield member 3 can properly protect the speaker 1 from the obstacle (for example, heat 61 and foreign matter 62). When the shield member 3 is made of a conductive material, it is grounded when the vehicle speaker system 10 is used. This allows the speaker 1 to be protected from electromagnetic noise caused in the engine compartment inner space SE.

Here, if a closed space is formed between the shield member 3 and the speaker 1, the back pressure is not sufficiently removed, and this may adversely affect the acoustic characteristics of the speaker 1. Accordingly, in the vehicle speaker system 10 of this embodiment, a first space S1 has an open part 7 (an upper open portion 7a and a lower open portion 7b) communicating with the engine compartment inner space SE. Formation of the open part 7 can reduce the influence on the acoustic characteristics of the speaker 1.

In the vehicle speaker system 10 of this embodiment, the open part 7 includes an upper open portion 7a located at a relatively upper position (Z2-side in the Z1-Z2 direction) in the first space S1 and a lower open portion 7b located at a relatively lower position (Z1-side in the Z1-Z2 direction). Since the upper open portion 7a is provided, gas existing inside the first space S1 can move upward (toward the Z2-side in the Z1-Z2 direction) to be exhausted from the first space S1. Gas in the engine compartment inner space SE is introduced from the lower open portion 7b into the first space S1.

As illustrated in FIGS. 1A and 1B, the engine 51 is located in the engine compartment inner space SE, and in particular, a large amount of heat 61 is emitted from the engine block 5b. The emitted heat 61 is prevented by the shield member 3 from directly reaching the speaker 1, but is directly applied to the shield member 3. For this reason, the gas existing inside the first space S1 is heated. Hence, an ascending air current is easily generated inside the first space S1. When the open part 7 has the upper open portion 7a, the heated gas inside the first space S1 is efficiently exhausted by this ascending air current, and this can suppress an excessive temperature rise in the first space S1. For this reason, the possibility that the speaker 1 will be adversely affected by the heat is more reliably reduced.

In the vehicle speaker system 10 of this embodiment, the shield member 3 is located inside the engine compartment inner space SE. Since the shield member 3 is located inside the engine compartment inner space SE, the obstacle shielded by the shield member 3 returns into the engine compartment inner space SE. Moreover, the gas inside the first space S1 more easily moves and the temperature of the speaker 1 is less likely to rise than when the shield member 3 is located in the vehicle-cabin inner space SR. Since the cut holes 11b of the frame 11 in the speaker 1 are located inside the vehicle-cabin inner space SR, a positive-phase sound pressure from the speaker 1 is properly emitted into the vehicle-cabin inner space SR.

While the shield member 3 is shaped like a plate in the vehicle speaker system 10 of this embodiment, the shape of the shield member 3 is not limited thereto. The plate-shaped shield member 3 is advantageous in, for example, high workability. While the plate-shaped shield member 3 is located to cover the entire opening 2a of the partition 2 in the vehicle speaker system 10 of the embodiment, the structure is not limited thereto. The shield member 3 may cover a part (for example, a portion near a center portion) of the opening 2a of the partition 2. When the shield member 3 covers the entire opening 2a of the partition 2, the risk of entry of the obstacle from the engine compartment inner space SE to the vehicle-cabin inner space SR is reduced more reliably.

Figure 3A:
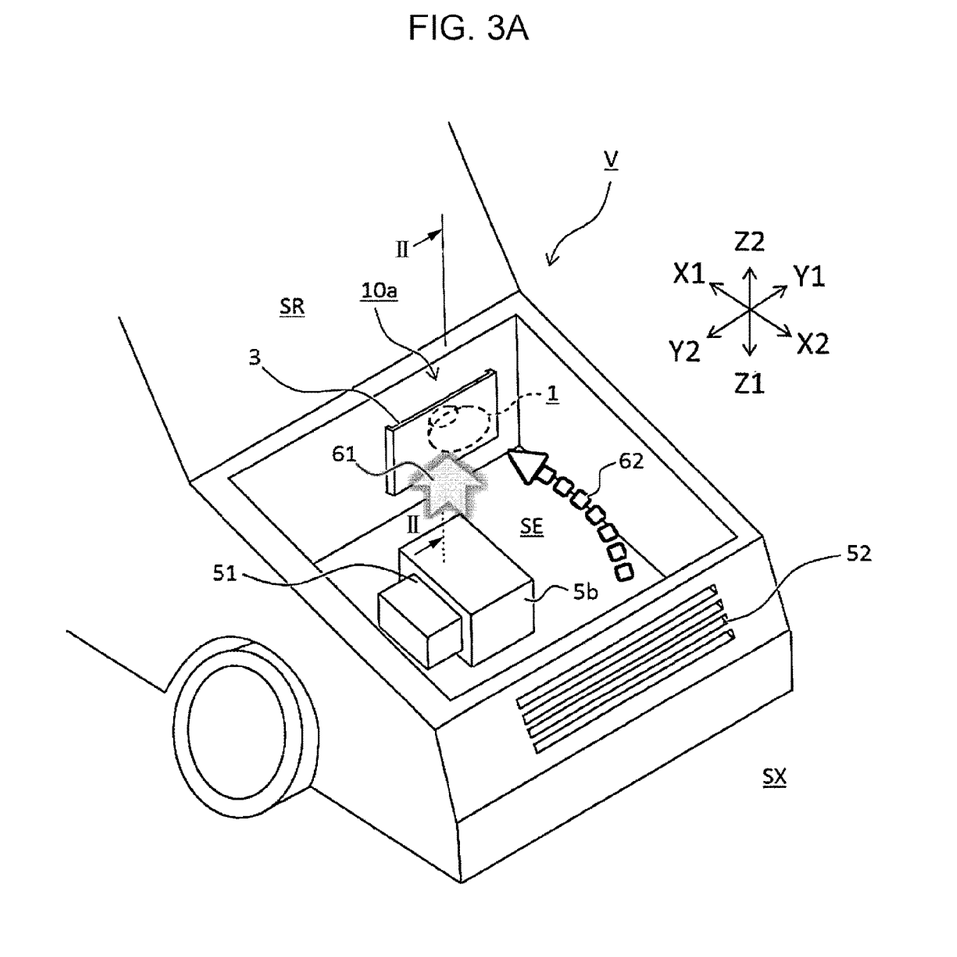
FIGS. 3A and 3B are a perspective view and a top view, respectively, conceptually illustrating a structure of a vehicle equipped with a vehicle speaker system according to an embodiment of the present invention.
Figure 3B:
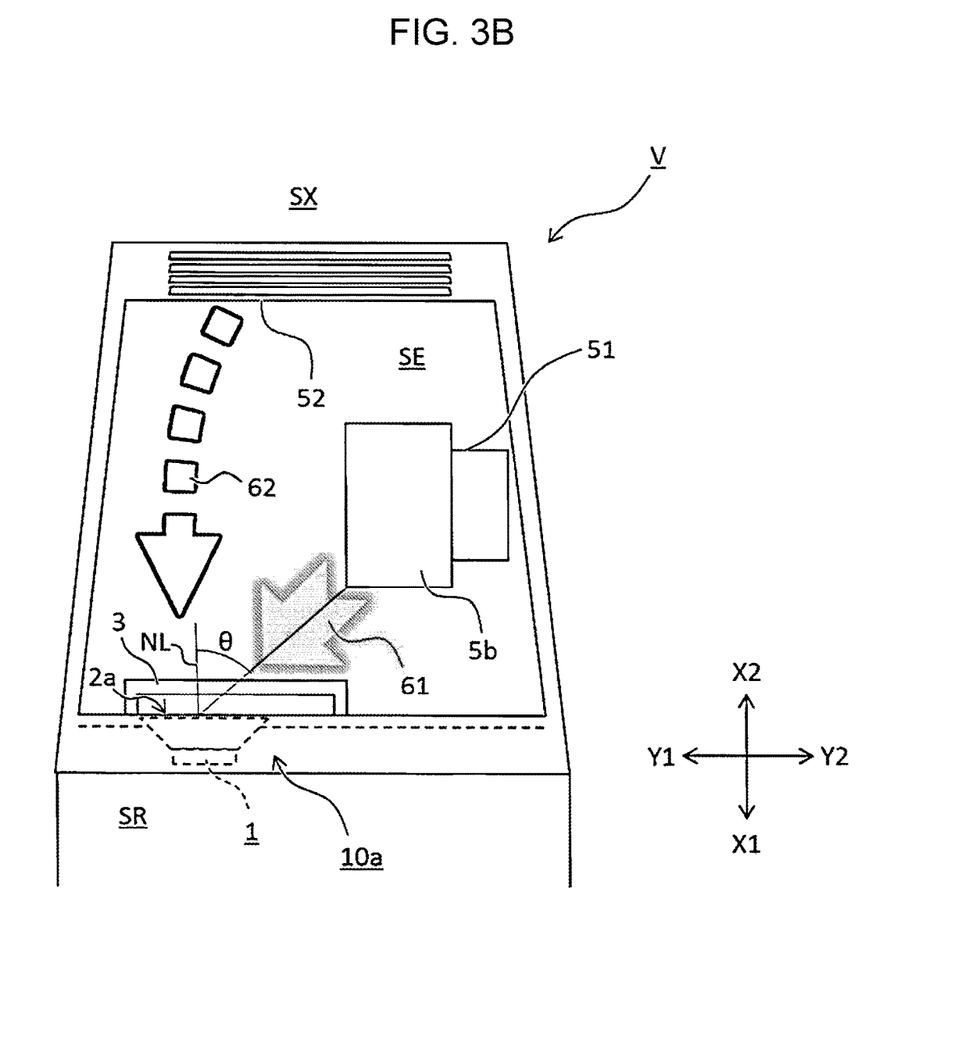

FIGS. 3A and 3B are a perspective view and a top view, respectively, conceptually illustrating a structure of a vehicle equipped with a vehicle speaker system according to a preferred example of an embodiment of the present invention. In a vehicle speaker system 10a illustrated in FIGS. 3A and 3B, as a preferred example, a shield member 3 is located so that an obstacle generation source (engine 51 and communication part 52) does not face the opening 2a. Such an arrangement of the shield member 3 can reliably prevent an obstacle (for example, heat 61 and foreign matter 62) emitted straight from the obstacle generation source (engine 51 and communication part 52) from reaching a speaker 1. Therefore, it is possible to more reliably reduce the possibility that the obstacle (for example, heat 61 and foreign matter 62) from the obstacle generation source (engine 51 and communication part 52) will reach the speaker 1.

In this specific example, an engine block 5b serving as a heat source is provided inside the engine compartment inner space SE and the speaker 1 is located in the vehicle cabin inner space SR in a positional relationship illustrated in FIGS. 3A and 3B. As illustrated in FIG. 3B, the engine block 5b is located at an angle θ of several tens of degrees to a normal line NL to a surface (open surface) of the opening 2a on the side of the engine compartment internal space SE. In this case, a member that constitutes the shield member 3 is disposed not only to cover the opening 2a but also to extend toward the engine block 5b (specifically, toward the Y2-side in the Y1-Y2 direction). Such an arrangement can more reliably reduce the possibility that heat 61 from the engine block 5b will reach the speaker 1.

In the vehicle speaker systems 10 and 10a according to this embodiment, the position of the speaker 1 relative to the partition 2 is fixed by mounting the frame 11 to the partition 2 with the mounting member 4 being disposed therebetween. However, the structure is not limited thereto. The position relative to the partition 2 may be fixed by directly mounting the frame 11 to the partition 2.

The method for fixing the position of the shield member 3 relative to the partition 2 is also not limited. In the vehicle speaker systems 10 and 10a of this embodiment, the shield member 3 is attached to the partition 2 by a support member 31 connected to the shield member 3. In this case, the structure of the vehicle speaker system 10 is simple and attachment is easy. The support member 31 has such a shape that the open part 7 is defined by the shield member 3, the partition 2, and the support member 31 when the support member 31 is attached to the partition 2. Since the support member 31 has such a structure, the open part 7 can be formed easily.

Figure 4:
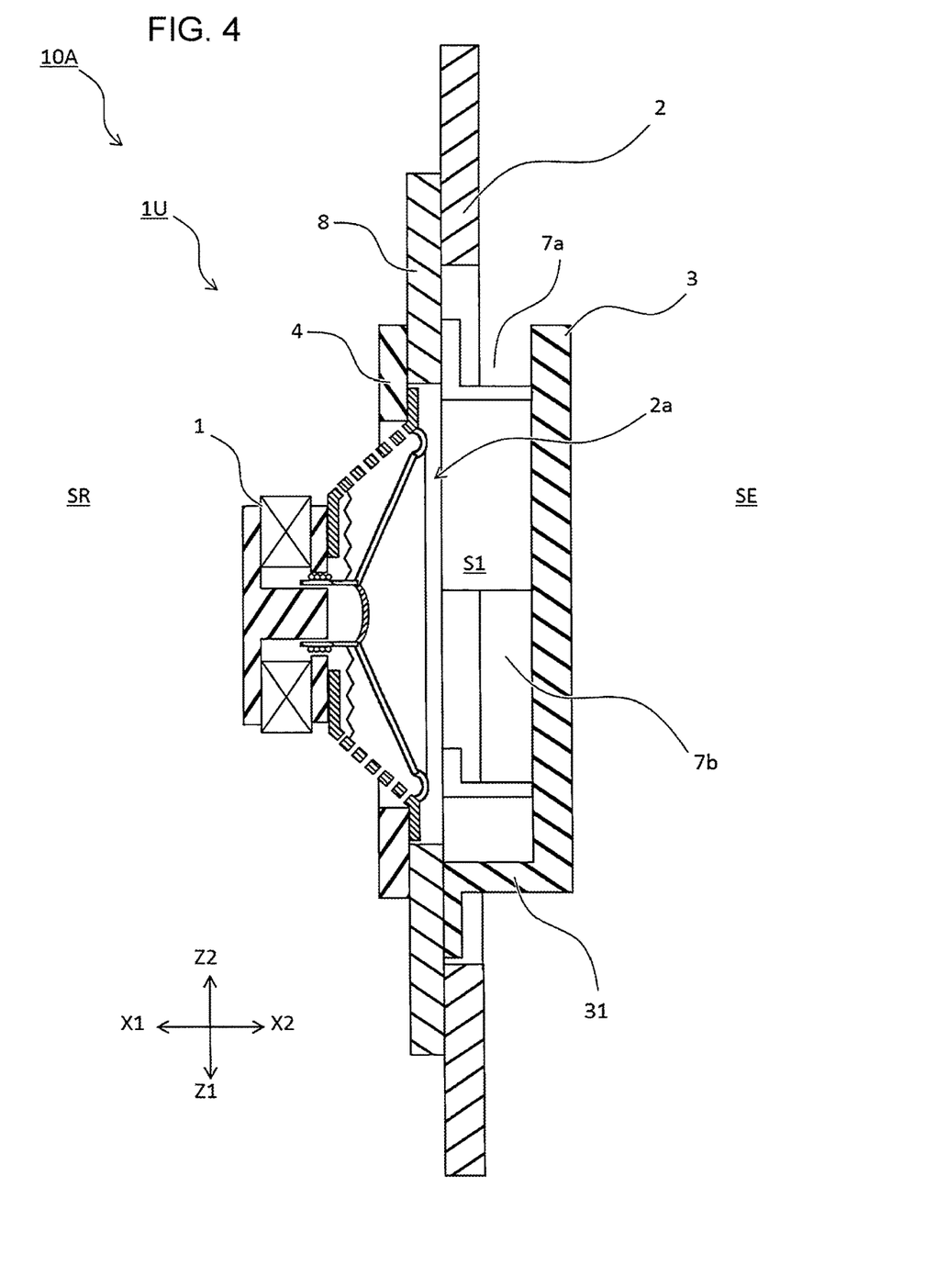
FIG. 4 is a cross-sectional view conceptually illustrating a structure of a vehicle speaker system according to another embodiment of the present invention.

FIG. 4 is a cross-sectional view conceptually illustrating a structure of a vehicle speaker system according to another embodiment of the present invention. As illustrated in FIG. 4, a vehicle speaker system 10A according to this embodiment includes a speaker unit 1U having a shield member 3 and a speaker 1. Specifically, the speaker 1 is attached to an annular unit attachment member 8 beforehand with a mounting member 4 being disposed therebetween, and the shield member 3 is attached to the unit attachment member 8 together with a support member 31. The unit attachment member 8 of the speaker unit 1U is mounted on a partition 2. By thus preparing the speaker unit 1U, the speaker 1 is easily installed in a vehicle V while properly reducing the influence of an obstacle (for example, heat 61 and foreign matter 62) from an engine compartment inner space SE. As long as the speaker unit 1U can be mounted in the vehicle V from the side of a vehicle-cabin inner space SR (X1-side in the X1-X2 direction), mounting operability is further increased. Particularly when the outer diameter of the shield member 3 is smaller than the diameter of an opening 2a of the partition 2, as illustrated in FIG. 4, the shield member 3 can be located inside the engine compartment inner space SE by mounting the speaker unit 1U from the vehicle-cabin inner space SR (X1-side in the X1-X2 direction).

Figure 5:
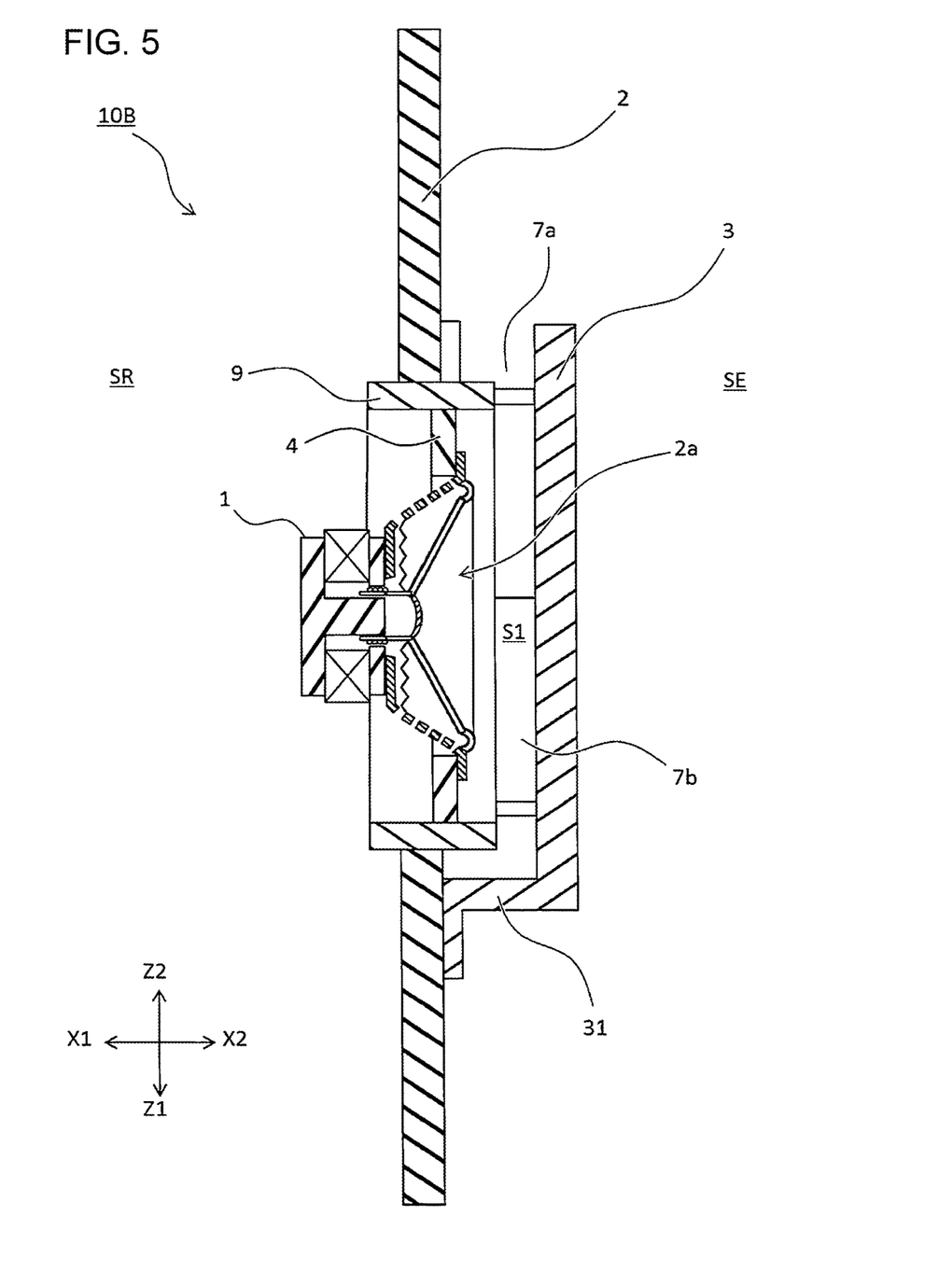
FIG. 5 is a cross-sectional view conceptually illustrating a structure of a vehicle speaker system according to a further embodiment of the present invention.

When it is required to adjust the opening area of the open part 7, a structure illustrated in FIG. 5 may be adopted. FIG. 5 is a cross-sectional view conceptually illustrating a structure of a vehicle speaker system according to a further embodiment of the present invention. In a vehicle speaker system 10B illustrated in FIG. 5, a mounting member 4 to which a speaker 1 is mounted is fixed to an inner wall of a cylindrical frame 9. By inserting the frame 9 into an opening 2a, the position of the speaker 1 relative to a partition 2 is fixed. Here, the opening areas of an upper open portion 7a and a lower open portion 7b can be adjusted by changing the degree of insertion of the frame 9 in the opening 2a.

In the vehicle speaker system 10B having the structure of FIG. 5, a distal end of the frame 9 projects into an engine compartment inner space SE. This projecting portion suppresses an obstacle from entering a first space S1 from directions other than the X1-X2 direction. Therefore, in the vehicle speaker system 10B, the possibility that an obstacle shielded by the shield member 3, especially foreign matter 62, will enter the first space S1 through an open part 7 owing to, for example, scattering or rebounding is reduced.

Since a large amount of heat is emitted from an engine block 5b in the engine compartment inner space SE, it is preferable to take measures to further reduce the influence of the heat on the speaker 1. For example, the shield member 3 and a support member 31 connected to the shield member 3 may be made of a material having a low thermal conductivity (for example, a heat-resistant resin material or a ceramic material having a low thermal conductivity). A low heat-transfer member made of a material having a low thermal conductivity may be interposed between the shield member 3 and the speaker 1. Specifically, it is sufficient that the mounting member 4 illustrated in FIGS. 3A to 5 or the unit attachment member 8 illustrated in FIG. 4 should be a low heat-transfer member.

Figure 6:
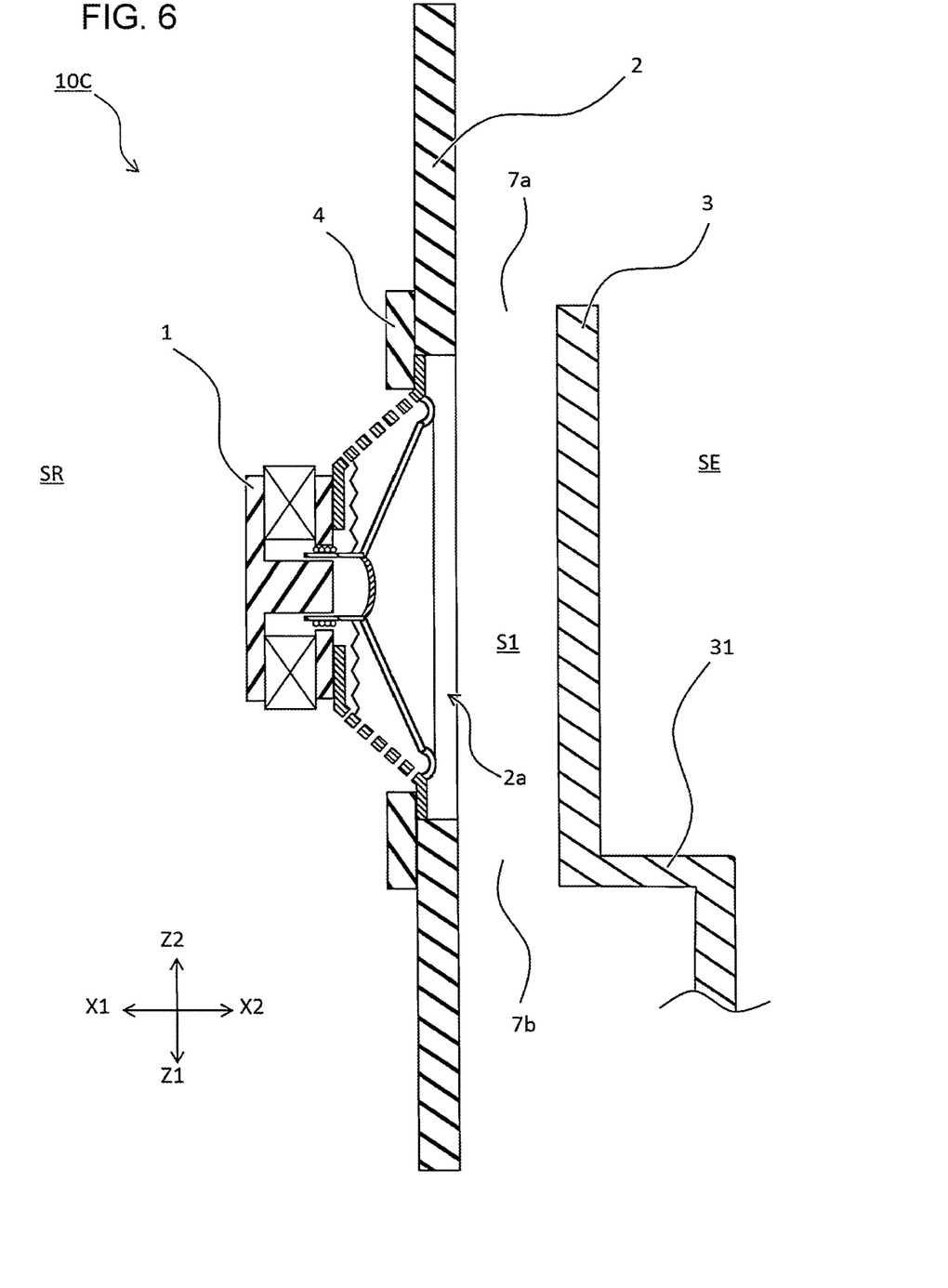
FIG. 6 is a cross-sectional view conceptually illustrating a structure of a vehicle speaker system according to a still further embodiment of the present invention.

From the viewpoint of more reliably avoiding the influence of heat from the engine compartment inner space SE on the speaker 1, a structure illustrated in FIG. 6 may be adopted. FIG. 6 is a cross-sectional view conceptually illustrating a structure of a vehicle speaker system according to a still further embodiment of the present invention. A vehicle speaker system 10C illustrated in FIG. 6 has a structure in which a shield member 3 and a speaker 1 are not in direct contact with each other. Specifically, a support member 31 connected to the shield member 3 is not fixed to a partition 2, but is attached to another member in an engine compartment inner space SE. The position of the shield member 3 relative to the partition 2 is thereby fixed. In the vehicle speaker system 10C having such a structure, an air current flowing from a lower open portion 7b to an upper open portion 7a is properly generated, and this can reliably suppress heat received by the shield member 3 from being transmitted to the speaker 1.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

For example, the speaker 1 may be located in any of the engine compartment inner space SE and the vehicle-cabin inner space SR, and a part of the speaker 1 may be located in the engine compartment inner space SE and the other part may be located in the vehicle-cabin inner space SR. The positional relationship between the opening 2a of the partition 2 and the speaker 1 is not limited. When the diaphragm 12 of the speaker 1 is opposed to the opening 2a or when a part of the speaker 1 is located in the engine compartment inner space SE through the opening 2a, a reverse-phase sound pressure ejected from the speaker 1 to the engine compartment inner space SE collides with the shield member 3, and is then reliably diffused from the open part 7 of the first space S1 into the engine compartment inner space SE. Therefore, it is sometimes preferable, from the viewpoint of maintaining the acoustic characteristics of the speaker 1, to adopt such a structure.

While the driving unit for the speaker 1 is the voice coil 16 in the above description, the structure is not limited thereto. The positional relationship between the diaphragm 12 and the driving unit in the speaker 1 may be arbitrarily determined. The diaphragm 12 in the speaker 1 may face the vehicle-cabin inner space SR, or conversely, may face the engine compartment inner space SE. When the diaphragm 12 of the speaker 1 faces the engine compartment inner space SE as in the vehicle speaker systems 10, 10a, 10A, and 10B of the above embodiments, since the diaphragm 12 is susceptible to the influence of the obstacle (for example, heat 61 and foreign matter 62), the effect of using the shield member 3 as in the present disclosure can be more reliably enjoyed.

What is claimed is:

1. A vehicle speaker system comprising a speaker unit having a speaker attached to a shield member,
    wherein the speaker includes:
    a diaphragm that generates a sound pressure;
    a frame that supports the diaphragm vibratably; and
    a driving unit attached to the frame to drive the diaphragm,
    wherein a position of the speaker relative to a partition separating a vehicle-cabin inner space and an engine compartment inner space is determined so that the sound pressure generated by an action of the diaphragm passes through an opening provided in the partition, and
    wherein the shield member has at least a part thereof being located between the speaker and an obstacle generation source located in the engine compartment inner space to obstruct an operation of the speaker, and an open part allowing a first space provided between the speaker and the shield member to communicate with the engine compartment inner space is provided in such a direction as not to be directed toward the obstacle generation source;
    the speaker and the shield member being pre-assembled in the speaker unit and configured to fit within the opening provided in the partition.

2. The vehicle speaker system according to claim 1, wherein the shield member is located to cover at least a center portion of the diaphragm.

3. The vehicle speaker system according to claim 1, wherein the shield member is located inside the engine compartment inner space.

4. The vehicle speaker system according to claim 1, wherein the shield member is shaped like a plate and is located to cover the entire opening.

5. The vehicle speaker system according to claim 1, wherein the shield member is located at such a position that the obstacle generation source does not face the opening.

6. The vehicle speaker system according to claim 1, wherein the open part includes a lower open portion into which a gas in the engine compartment inner space flows and an upper open portion that allows a gas inside the first space to move upward and to be exhausted from the first space.

7. The vehicle speaker system according to claim 1, wherein the position of the speaker relative to the partition is fixed by attaching the speaker unit to the partition.

8. The vehicle speaker system according to claim 1, wherein the shield member is attached to the speaker by a support member connected to the shield member.

9. The vehicle speaker system according to claim 1, wherein a position of the speaker unit including the shield member and the speaker relative to the partition is fixed.

10. The vehicle speaker system according to claim 1, wherein a low heat-transfer member is interposed between the shield member and the speaker.

11. The vehicle speaker system according to claim 1, wherein the shield member and the speaker are not in direct contact with each other.

12. The vehicle speaker system according to claim 1, wherein the shield member is made of a conductive material and is grounded at least during use.

13. A vehicle speaker system comprising:
    a speaker including a diaphragm that generates a sound pressure; a frame that supports the diaphragm vibratably; and a driving unit attached to the frame to drive the diaphragm, wherein the speaker is configured so that sound pressure generated by an action of the diaphragm passes through an opening provided in a partition separating a vehicle-cabin inner space and an engine compartment inner space;
    a mounting frame to which the speaker is adapted to be fixed, the mounting frame being configured to be mounted on the partition; and a shield member configured to be located at least partly between the speaker and an obstacle generation source located in the engine compartment inner space, wherein an open part allowing a first space provided between the speaker and the shield member to communicate with the engine compartment inner space is provided in such a direction as not to be directed toward the obstacle generation source;

wherein the shield member is attached to the mounting frame.

14. The vehicle speaker system according to claim 13, wherein the shield member is located to cover at least a center portion of the diaphragm.

15. The vehicle speaker system according to claim 13, wherein the shield member is located inside the engine compartment inner space.

16. The vehicle speaker system according to claim 13, wherein the shield member is shaped like a plate and is located to cover the entire opening.

17. The vehicle speaker system according to claim 13, wherein the shield member is located at such a position that the obstacle generation source does not face the opening.

18. The vehicle speaker system according to claim 13, wherein the open part includes a lower open portion into which a gas in the engine compartment inner space flows and an upper open portion that allows a gas inside the first space to move upward and to be exhausted from the first space.

19. The vehicle speaker system according to claim 13, wherein the shield member is attached to the mounting frame by a support member connected to the shield member.

20. The vehicle speaker system according to claim 13, wherein a low heat-transfer member is interposed between the shield member and the speaker.

21. The vehicle speaker system according to claim 13, wherein the shield member and the speaker are not in direct contact with each other.

22. The vehicle speaker system according to claim 13, wherein the shield member is made of a conductive material and is configured to be grounded during use.

\* \* \* \* \*